Figure 1:
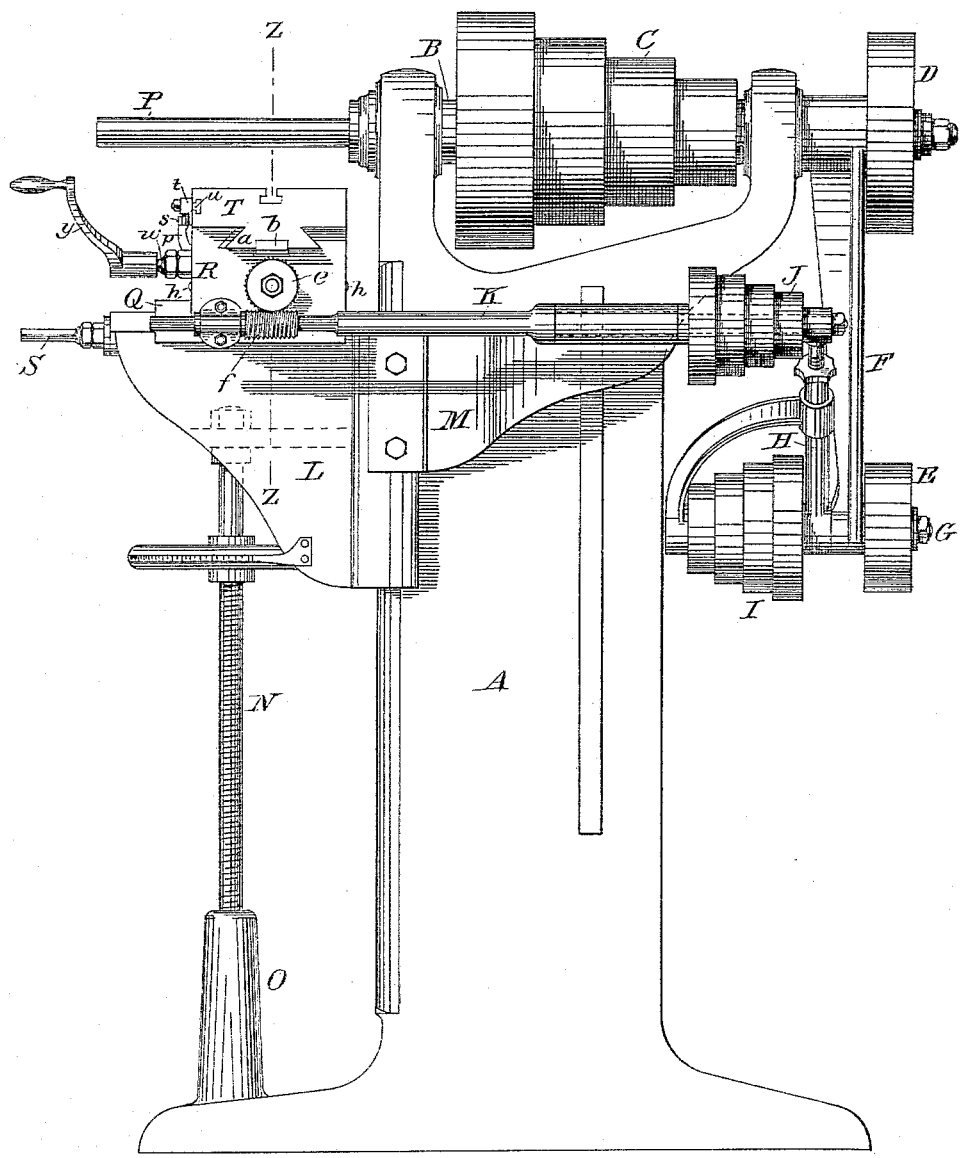

(No Model.) 2 Sheets—Sheet 1.
A. H. BRAINARD.
MILLING MACHINE.

No. 378,427. Patented Feb. 28, 1888.

WITNESSES.
Charles H. Fogg.
Eugene Humphrey.

INVENTOR.
Amos H. Brainard.
fr T. W. Porter, Atty.

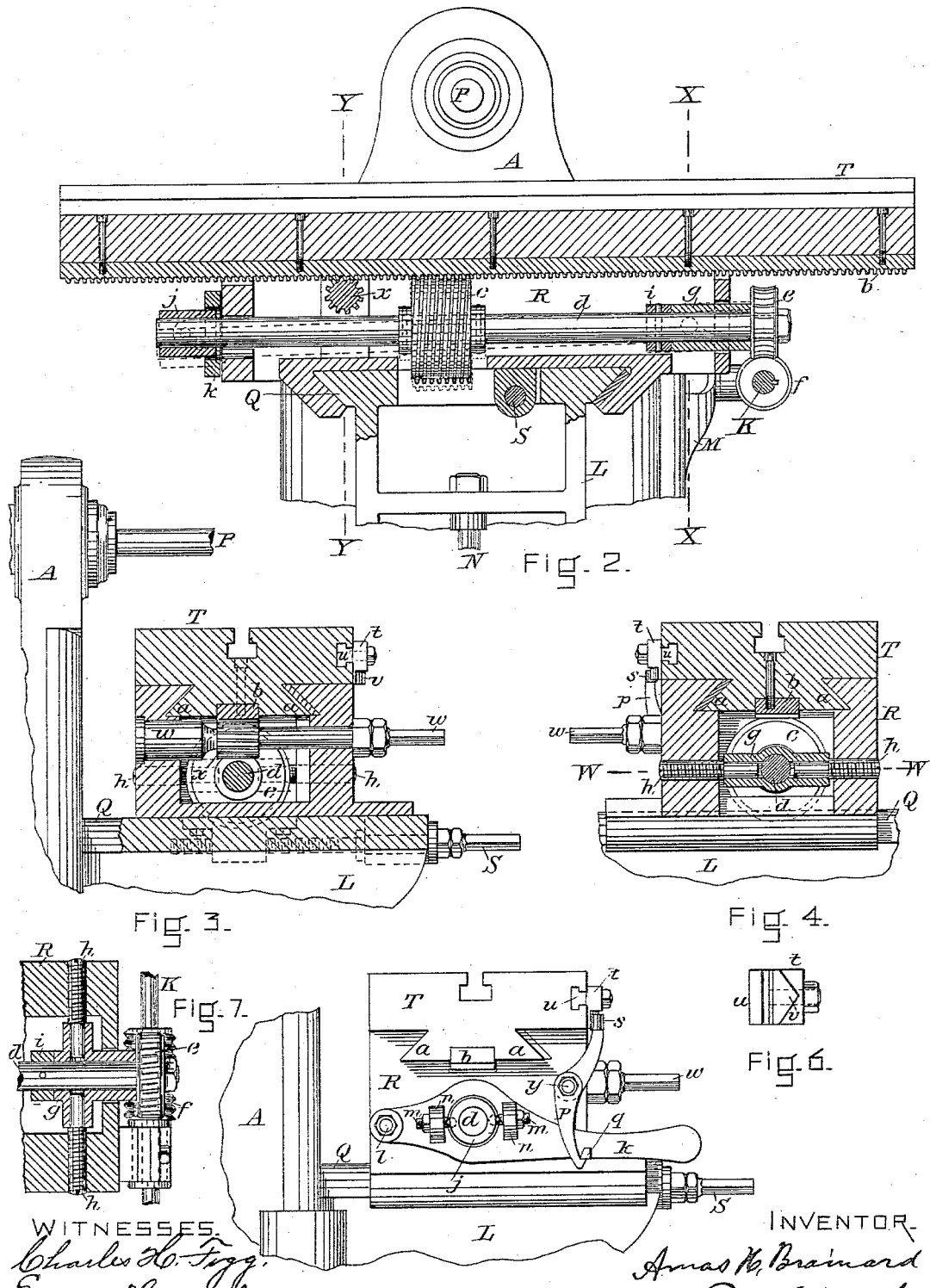

UNITED STATES PATENT OFFICE.

AMOS H. BRAINARD, OF HYDE PARK, MASSACHUSETTS.

MILLING-MACHINE.

SPECIFICATION forming part of Letters Patent No. 378,427, dated February 28, 1888.

Application filed May 25, 1887. Serial No. 239,289. (No model.)

*To all whom it may concern:*

Be it known that I, AMOS H. BRAINARD, of Hyde Park, in the county of Norfolk and State of Massachusetts, have invented a new and useful Improvement in Milling-Machines, which will, in connection with the accompanying drawings, be hereinafter fully described, and specifically defined in the appended claims.

In said drawings, Figure 1 is a side elevation of a milling-machine embodying my invention, said view being taken as from the right in Fig. 2. Fig. 2 is a sectional elevation of the upper portion of the machine shown in Fig. 1, the section being taken on line Z Z, Fig. 1, and the view as from the left in that figure. Fig. 3 is also a sectional elevation of the upper parts of the same machine, the section being taken as on line Y Y, Fig. 2, and the view as from the left in that figure, or as from the side opposite to that shown in Fig. 1. Fig. 4 is a vertical section taken on line X X, Fig. 2, and viewed as from the right in that figure. Fig. 5 is a detached elevation taken as from the left in Fig. 2, or as from the side opposite to that shown in Fig. 1. Fig. 6 is a detached inverted plan view of the feed-tripping cam. Fig. 7 is a detached sectional plan view showing the means and method for pivoting the tilting arbor which carries the table feeding-screw.

This invention relates to that class of metal-working machines termed "milling-machines;" and it consists in features of novelty hereinafter fully described, and pointed out in the claims.

Referring again to the drawings, A represents the frame or standard, having a suitable base and formed at the top with journal-bearings for arbor B, which carries the cutting-tool spindle P, and is driven by a belt leading from the pulley on the counter-shaft to pulley C on said arbor. A belt leading from pulley D on the rear end of arbor B drives the short arbor G through its pulley E, said arbor G being supported by the pendent swinging arm F, supported on arbor B. An arbor, K, is journaled in bearings in carriage R and arm M of knee L, and carries the cone-pulley J, through which this arbor is driven by a belt from cone I on arbor G to said cone J, such belt being held taut by adjustable telescopic rod H, said knee and the parts mounted thereon being vertically adjustable by means of screw N, stepped in the knee and threaded in boss O of frame A. Upon the dovetail Q of knee L is gibbed the carriage R, which, by means of screw-shaft S, is adjusted toward or from frame A, as desired, while table T, by its dovetail a, gibbed in a corresponding passage in carriage R, is arranged to move lineally upon said carriage. The feed motion of table T is effected through its rack b, engaged by endless screw c, carried by shaft d, which latter is rotated by screw f on shaft K engaging tangent-wheel e, secured on shaft d, the teeth of said rack b being cut as an arc of a nut corresponding to the pitch of the thread of screw c, which engages said rack.

All of the parts thus far described and the arrangement thereof being old and well known, as shown in United States Patent issued to me October 1, 1872, a more detailed description is not deemed necessary. Said shaft d, at the end that carries wheel e, is journaled in the tubular T-slot, marked g, Figs. 3, 4, 7, which is itself pivotally supported by trunnion-like screws h, threaded in the walls of carriage R, as shown in Figs. 4 and 7, said shaft being secured from lineal displacement in said bearing g by said wheel e and a set-collar, i, at the opposite end of g, as shown in Figs. 2 and 7. The opposite end of said rod d is journaled in sleeve j, which is supported by lever k, pivoted to carriage R at l, and formed with ears n, between which sleeve j is supported by the pivot-screws m, which are threaded in said ears, as shown in Fig. 5, and are seated in the sleeve. Said lever k is, when raised, supported by latch p, pivoted at y to carriage R, the hook at the lower end of said latch engaging stud q, formed on the lever, as shown in Fig. 5. A trundle, s, is mounted on the upper part of said latch, and is engaged by the cam v, formed on block t, which is secured to table T by bolt u, seated in the continuous T-slot shown in said table; and by adjusting said cam-block at the desired point on table T latch p will at the proper moment be tripped by the cam, allowing lever k and the end of shaft d, thereby supported, to fall, thus disconnecting screw c from rack b and stopping the feed of the table at the desired point. When lever $k$ thus falls, the shaft $d$ and its T-shaped bearing $g$ vibrate on pivot-screws $h$, thereby slightly raising wheel $e$, but not sufficiently to disengage it from screw $f$; hence shaft $d$ continues to revolve when its screw $c$ is disengaged from rack $b$.

As the rotation of shafts K and $d$ is constant in the same direction, therefore table T is thereby moved in but one direction, and that to feed the work thereon secured to the rotary cutter on spindle P; and in order to return the table to first position I journal a shaft, $w$, in carriage R, and I form or secure on said shaft a pinion, $x$, whose teeth coincide in spirality and pitch with those of rack $b$, and as said pinion is permanently in mesh with the rack, therefore, when the table is being moved by screw $c$, said pinion and its shaft revolve as idlers, and when, by the described releasing of lever $k$, shaft $d$ falls, it then revolves as an idler, when, by use of crank $y$ on shaft $w$, the table is rapidly returned to the starting-point; hence by my invention I am enabled to utilize in the same machine, without complication of parts, the advantages of a screw-feed, which is constant and uniform in its movement, with the rapidity of the return movement, which may be effected by a rack and pinion driven by hand.

It will be obvious that various methods and devices may be employed to engage and disengage screw $c$ with and from the rack of table T, and hence while I do not confine myself to the means shown, yet I deem them the preferable means.

I claim as my invention—

1. In a milling-machine, the combination, with the lineally-reciprocating feed-table provided with a rack, of a shaft duly driven and carrying an endless screw arranged to be enmeshed with and disconnected from said rack, and a pinion duly journaled and enmeshed with said rack and arranged to be actuated by a crank to lineally move said table, all substantially as specified.

2. In a milling-machine, the combination of a work-table provided with a rack, a worm-gear-actuated shaft, a screw on said shaft arranged to be enmeshed with or disengaged from said rack, and a pinion enmeshed with said rack and provided with means whereby it may be rotated by a hand-driven crank, all substantially as specified.

3. The combination, with table T, of rack $b$, tilting shaft $d$, with means to rotate and tilt it, screw $c$, carried by said shaft, and pinion $e$, duly journaled and enmeshed with said rack, and means whereby said pinion may be rotated by a crank, substantially as specified.

4. The combination of tilting shaft $d$, lever $k$, bearing $j$, supporting said shaft, latch $p$, arranged to engage and support the lever, and adjustable cam $t$, arranged to actuate said latch and liberate said lever, all substantially as specified.

5. The combination, with tilting shaft $d$, of lever $k$, connected with said shaft, and latch $p$, arranged to be engaged with and disconnected from said lever, substantially as specified.

6. In a milling-machine, the combination, with the work-supporting table provided with a rack, of a screw arranged to engage said rack and mounted upon a shaft provided with means whereby it may be raised and lowered to engage and disengage said screw with and from the rack, substantially as specified.

7. In a milling-machine, the combination, with the work-supporting table and its rack, of a driving screw-shaft journaled near one end in a bearing supported upon fixed pivots and at the opposite end supported in a bearing arranged to be raised and lowered, whereby said screw may be enmeshed with and disconnected from said rack, substantially as specified.

8. The combination, with screw-shaft $d$, journaled in pivotal bearing $g$, of pivoted lever $k$, and the journal-bearing $j$ of said shaft pivoted to said lever, substantially as specified.

AMOS H. BRAINARD.

Witnesses:
T. W. PORTER,
CHARLES H. FOGG.